United States Patent

Spatafora et al.

[11] Patent Number: 5,988,354
[45] Date of Patent: Nov. 23, 1999

[54] PRODUCT CONVEYING UNIT

[75] Inventors: Mario Spatafora; Fabrizio Tale', both of Bologna, Italy

[73] Assignee: Azionaria Costruzioni Macchine Automatiche A.C.M.A S.p.A., Bologna, Italy

[21] Appl. No.: 08/932,627

[22] Filed: Sep. 17, 1997

[30] Foreign Application Priority Data

Sep. 17, 1996 [IT] Italy .................................. BO96A0462

[51] Int. Cl.$^6$ ................................................. B65G 47/244
[52] U.S. Cl. .................... 198/471.1; 198/411; 198/374
[58] Field of Search .................... 198/374, 398, 198/400, 411, 377.06, 377.07, 377.02, 377.03, 377.04, 471.1, 475.1

[56] References Cited

U.S. PATENT DOCUMENTS

| | | | |
|---|---|---|---|
| 4,394,898 | 7/1983 | Campbell | 198/374 |
| 5,188,212 | 2/1993 | Munsch | 198/471.1 X |
| 5,417,037 | 5/1995 | Osti et al. | 198/374 X |
| 5,641,053 | 6/1997 | Nannini et al. | 198/471.1 X |
| 5,647,190 | 7/1997 | Minarelli et al. | 198/471.1 X |
| 5,871,079 | 2/1999 | Nannini et al. | 198/377.04 |

FOREIGN PATENT DOCUMENTS

| | | |
|---|---|---|
| 0 439 897 A1 | 8/1991 | European Pat. Off. . |
| 0 731 022 A1 | 9/1996 | European Pat. Off. . |
| 31 00 866 A1 | 1/1982 | Germany . |
| 44 05 837 A1 | 8/1994 | Germany . |

Primary Examiner—James R. Bidwell
Attorney, Agent, or Firm—Larson & Taylor

[57] ABSTRACT

A unit for conveying elongated products, each having a respective longitudinal axis, and wherein a conveyor successively conveys the products with the respective longitudinal axes parallel to a given traveling direction and along a path extending along a conveying plane; and an orienting assembly is located along the path to orient the products by rotating the products 90° about an axis of rotation crosswise to the conveying plane, so that the respective longitudinal axes of the products are crosswise to the traveling direction.

19 Claims, 2 Drawing Sheets

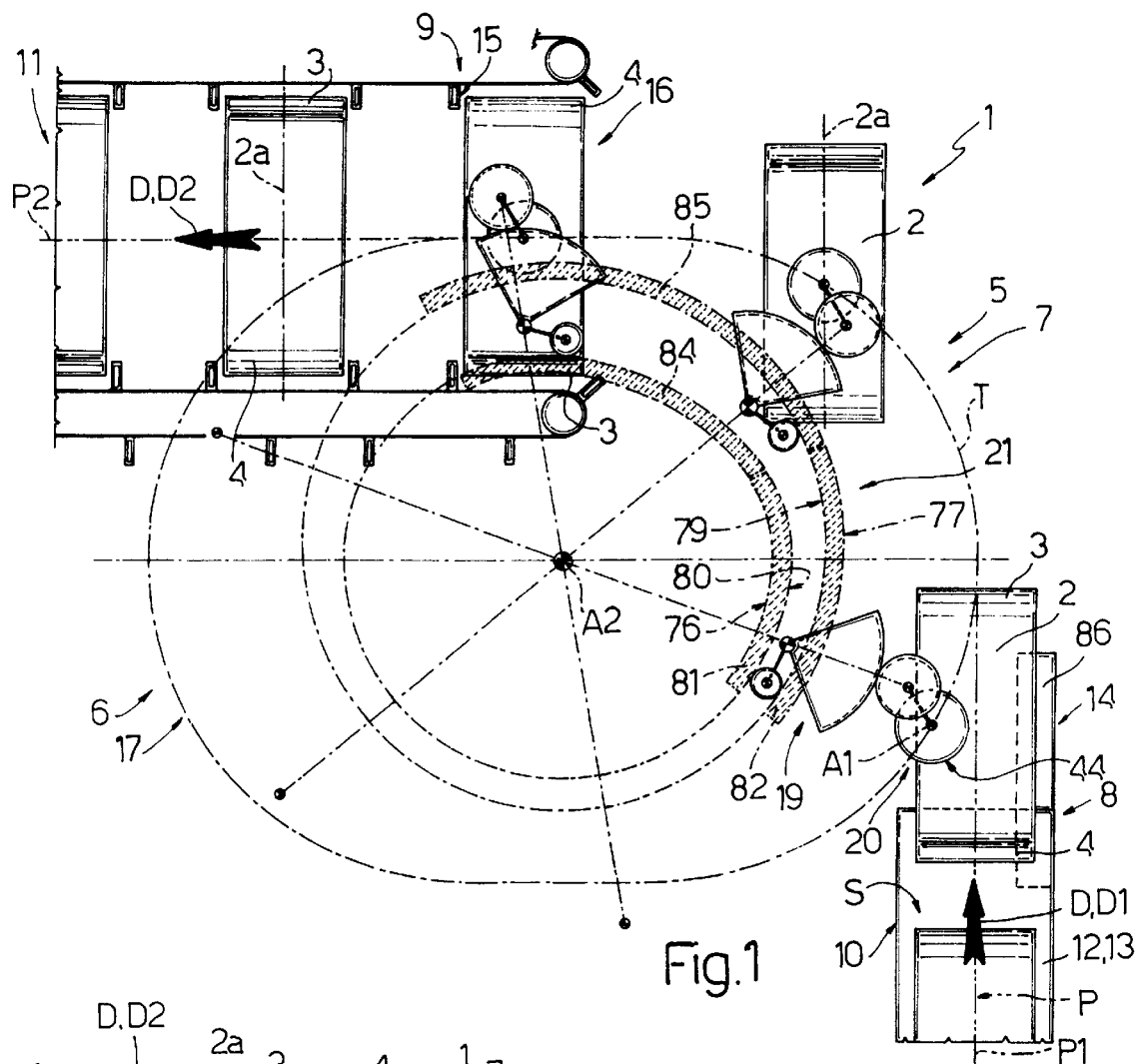

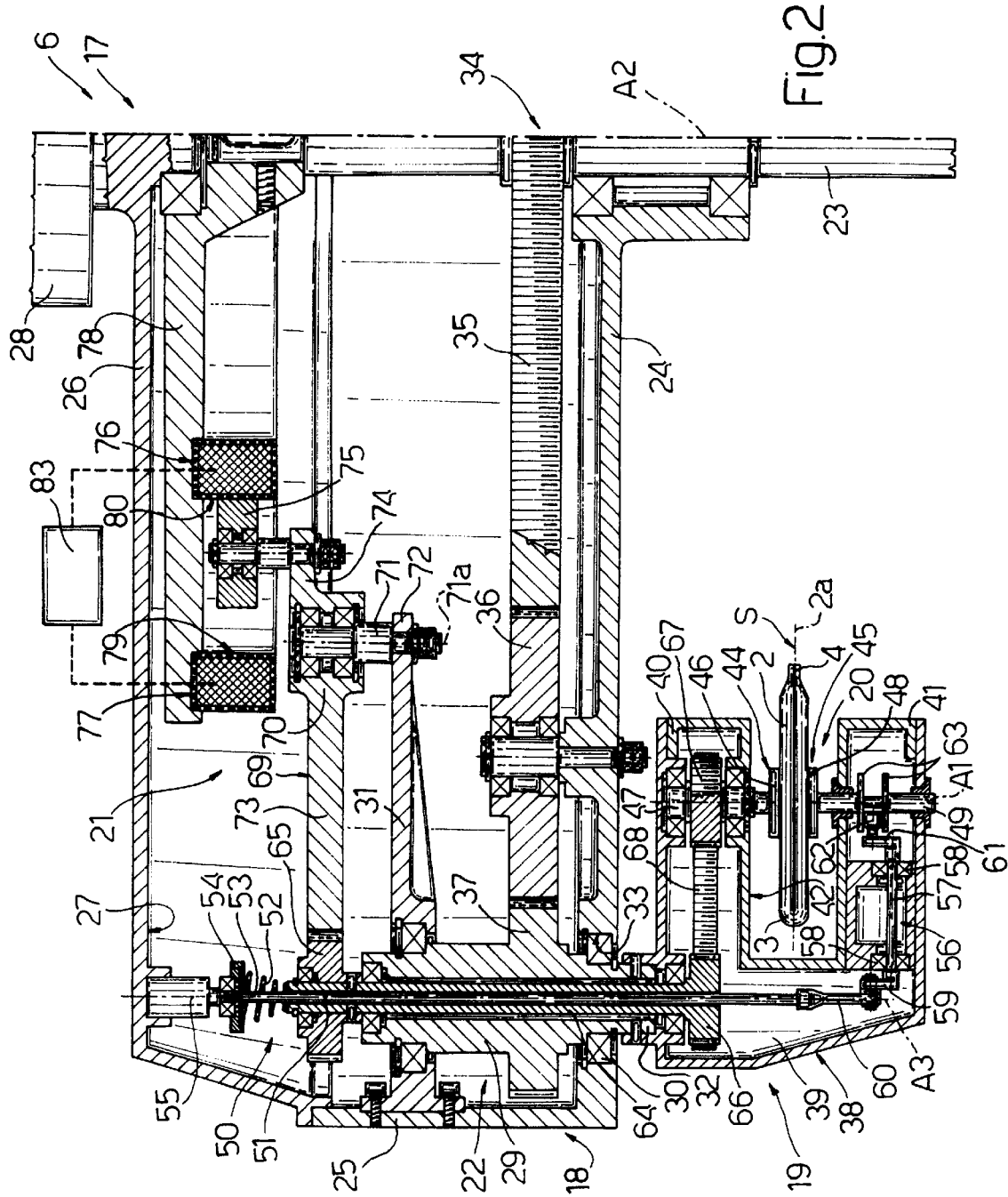

PRODUCT CONVEYING UNIT

BACKGROUND OF THE INVENTION

The present invention relates to a product conveying unit.

More specifically, the present invention relates to a unit for conveying substantially elongated products, to which the following description refers purely by way of example.

Though specific reference is made in the following description to a unit for conveying diapers, the same also applies to other substantially elongated products, such as food products.

On diaper manufacturing systems, a succession of U-folded diapers is fed to a stacking device along a given path, along which each diaper is fed parallel to its longitudinal axis, with the U-folded edge facing forwards and crosswise to the longitudinal axis, and is maintained in this position up to the stacking device.

Known stacking devices normally comprise a pocket conveyor, the pockets of which are fed in steps across the path of the diapers, in a direction crosswise to both the traveling direction and the folded edge of the diapers, and are arrested successively along the path of the diapers to enable each diaper to be inserted, folded edge first, inside a respective pocket.

In addition, obviously, to depending on the traveling speed of the diapers, the operating frequency of the stacking device also depends, for a given traveling speed, on the length of the diapers, i.e. the dimension of the diapers crosswise to the folded edge, and which is always greater than the dimension parallel to the folded edge. That is, the longer the diaper is, the longer it takes, at a given traveling speed, for each to be inserted inside the respective pocket on the stacking device, and the slower the operating frequency of the stacking device is.

On the other hand, the operating frequency of the stacking device can only be increased so far by increasing the traveling speed of the diapers. Experience has shown, in fact, that, despite the folded edge being the strongest part of the diaper, the diapers are invariably damaged on impact with the bottom of the respective pockets, when the traveling speed of the diapers—which corresponds to a given output speed of the system and a given operating frequency of the stacking device—is increased over and above a given limit.

SUMMARY OF THE INVENTION

It is an object of the present invention to provide a conveying unit enabling the traveling speed of the diapers to be reduced with no alteration in the operating frequency of the stacking device.

According to the present invention, there is provided a conveying unit for conveying elongated products, each having a respective longitudinal axis; the unit comprising conveying means for successively feeding the products with the respective longitudinal axes parallel to a given traveling direction and along a path extending along a conveying plane; and the unit being characterized by comprising orienting means located along said path, and for orienting the products by rotating the products 90° about a first axis of rotation crosswise to said conveying plane, so that the longitudinal axes of the products are positioned crosswise to said traveling direction.

As is known, at the output of the stacking device, the diapers are formed into groups for packing, each group defined by a given number of diapers arranged side by side on edge with the folded edges of the diapers all on the same side and contacting one another. As each diaper, however, is thicker at the folded edge, the groups are of irregular shape and thicker at the folded edge end, which not only makes subsequent packing of the groups difficult, but also limits the number of diapers in each group.

It is therefore a further object of the present invention to so form the conveying unit defined above as not only to simplify packing but also to permit the formation of groups containing any number of diapers.

For this purpose, therefore, said orienting means of the conveying unit defined above preferably comprise selecting means for selecting the products to be rotated in one direction or the other about said first axis of rotation, so that said products are oppositely oriented with respect to one another.

Moreover, said orienting means preferably rotate the products alternately in one direction or the other about said first axis of rotation, so that the products are alternately oppositely oriented.

BRIEF DESCRIPTION OF THE DRAWINGS

A number of non-limiting embodiments of the present invention will be described by way of example with reference to the accompanying drawings, in which:

FIG. 1 shows a schematic plan view, with parts removed for clarity, of a first preferred embodiment of a diaper conveying unit in accordance with the present invention;

FIG. 2 shows a partially sectioned view, with parts removed for clarity, of a detail in FIG. 1;

FIG. 3 shows a schematic plan view, with parts removed for clarity, of a second preferred embodiment of the FIG. 1 unit.

DETAILED DESCRIPTION OF THE INVENTION

Number 1 in FIG. 1 indicates a conveying unit for conveying diapers 2, each of which comprises a respective longitudinal axis 2a, and is folded into a U crosswise to axis 2a to define, at one end, a U-folded edge 3 crosswise to axis 2a, and, at the other end, two superimposed ends 4.

Unit 1 comprises a conveying assembly 5 for successively conveying diapers 2 with respective axes 2a parallel to a given traveling direction D and along a path P extending along a substantially horizontal conveying plane S; and an orienting assembly 6 located at an orienting station 7 along path P, and for orienting products 2 by rotating products 2 by 90° about an axis of rotation A1 crosswise to plane S, so that, along path P and downstream from station 7 in traveling direction D, products 2 are positioned with respective axes 2a crosswise to traveling direction D.

More specifically, conveying assembly 5 provides for conveying diapers 2 with respective folded edges 3 forwards; and orienting assembly 6 provides for rotating diapers 2 about respective axes A1, so that diapers 2 are alternately oppositely oriented with respect to one another, and with respective folded edges 3 parallel to direction D.

Conveying assembly 5 comprises two belt conveyors 8 and 9, which respectively define, along path P, an input portion P1 and an output portion P2 respectively upstream and downstream from station 7, and respectively define, in traveling direction D, an input direction D1 and an output direction D2, for conveying respective successions 10 and 11 of diapers 2 in respective directions D1 and D2, which, in the FIG. 1 embodiment, are crosswise to each other.

More specifically, conveyor 8 comprises an endless belt 12, the upper conveying branch 13 of which is coplanar with plane S, and provides for feeding diapers 2 along portion P1 at a given speed V1 and a given frequency F1, and for feeding diapers 2 onto assembly 6 at a pick-up station 14 forming part of orienting station 7; and conveyor 9 comprises a number of pockets 15 for receiving respective diapers 2 from assembly 6 at an unloading station 16 forming part of station 7, and provides for feeding diapers 2 along portion P2 at a frequency F2 equal to frequency F1, and at a speed V2 lower than speed V1.

As shown in FIG. 2, orienting assembly 6 comprises a rotary-platform, so-called "spider" type transfer device 17, in turn comprising a platform 18 rotating (anticlockwise in FIG. 1) about an axis of rotation A2 crosswise to plane S, and a number of transfer assemblies or heads 19 fitted to platform 18, and for receiving respective diapers from conveyor 8 at pick-up station 14, and feeding diapers 2 onto conveyor 9 at unloading station 16. Heads 19 are equally spaced about axis A2, and are movable, together with platform 18 and between stations 14 and 16, along an annular trajectory T, which is substantially circular at least between stations 14 and 16, and joins path portions P1 and P2.

Orienting assembly 6 also comprises a gripping device 20 for each head 19, and which provides for gripping a respective diaper 2 at station 14 and releasing it at station 16; a selecting device 21 for selecting which diapers 2 to rotate 90° in one direction or the other about respective axes Al; and, for each head 19, a transmission device 22 interposed between device 21 and respective device 20.

Platform 18 is supported for rotation about axis A2 and in axially fixed manner on a fixed vertical shaft 23, and comprises a horizontal disk 24 crosswise to axis A2; a cylindrical wall 25 coaxial with axis A2 and connected integrally to the periphery of disk 24; and an upper cup-shaped body 26 connected to wall 25, and which defines a substantially cylindrical chamber 27 together with wall 25 and disk 24, and supports, outside chamber 27 and coaxially with axis A2, a motor 28 for driving device 17.

For each head 19, platform 18 comprises a tubular output shaft 29, which is fitted in rotary manner to disk 24, partly inside chamber 27, via the interposition of a ball bearing 30, and which is further fitted to wall 25 by a horizontal bracket 31 connected to wall 25 and extending radially towards axis A2. Each shaft 29 has a bottom end 32 extending outwards of chamber 27 through a respective hole 33 in disk 24 and supporting a respective head 19 in angularly fixed manner, and is rotated about a respective axis of rotation A3 parallel to axis A2, and at an angular speed equal to the angular speed of platform 18, by an epicyclic transmission 34 comprising a sun gear 35 housed inside chamber 27, fitted to an intermediate portion of shaft 23, and coaxial with axis A2. Transmission 34 also comprises, for each shaft 29, a planet gear 36 meshing with sun gear 35 and fitted in rotary manner to disk 24 between sun gear 35 and shaft 29; and a further planet gear 37 coaxial with axis A3, formed in one piece with shaft 29, and located between disk 24 and respective bracket 31.

More specifically, shafts 29 rotate about respective axes A3 in the opposite direction to that of platform 18, so that, by virtue of the combined rotation of platform 18 and the rotation of shafts 29 about respective axes A3, respective heads 19 are maintained parallel to themselves at all times. As platform 18 rotates, heads 19 (and, more specifically, respective axes Al) travel along trajectory T through station 14—located at the output end of conveyor 8 where trajectory T is substantially tangent to path portion P1—and through station 16 located at the input end of conveyor 9 and separated from station 14 by a substantially 90° arc downstream in the rotation direction of platform 18.

Each head 19 is defined by a fork 38, which comprises a central body 39 fitted to the bottom end 32 of respective shaft 29 and substantially coaxial with respective axis A3; and two arms 40 and 41 substantially equal in length to the distance between axes A3 and A1, extending one over the other from body 39 and crosswise to axes A3 and A1, and defining a U-shaped cavity 42 engaged by respective gripping device 20 for receiving and retaining a respective diaper 2.

Each gripping device 20 comprises two jaws 44 and 45 facing each other and fitted to respective arms 40 and 41 inside cavity 42. More specifically, jaw 44 is supported for rotation about respective axis A1, and is defined by a disk 46 coaxial with axis A1 and having a supporting shaft 47 extending upwards and in axially fixed manner inside respective arm 40; and jaw 45 is supported for rotation about respective axis A1, and is defined by a disk 48 coaxial with axis A1, positioned facing disk 46, and having a supporting shaft 49 extending downwards and in axially sliding manner inside respective arm 41.

By virtue of an opening device 50, each jaw 45 is movable, along respective axis A1 and with respect to respective jaw 44, between a forward gripping position (FIG. 2) in which jaws 44 and 45 grip a respective diaper 2, and a withdrawn release position (not shown).

Each opening device 50 is housed inside chamber 27, and comprises a rod 51 housed in axially sliding manner inside respective tubular shaft 29; a helical return spring 52 fitted about the top end 53 of rod 51 and interposed between shaft 29 and a flange 54 fitted to end 53; and a linear actuator 55 fitted to body 26 and acting on rod 51 in opposition to spring 52. Each device 50 also comprises a rocker arm 56 interposed between shaft 49 and rod 51, and in turn comprising a horizontal rod 57 extending inside arm 41 and supported in rotary manner via the interposition of two ball bearings 58 inside arm 41; a first radial arm 59 fitted to one end of rod 57 and engaged in rotary manner at the bottom end 60 of respective rod 51; and a second radial arm 61 fitted to the opposite end of rod 57 and supporting a roller 62 engaged between two flanges 63 of shaft 49 to move shaft 49 along respective axis A1 when rod 51 is moved axially along respective axis A3.

Each transmission device 22 comprises a tubular shaft 64 housed in rotary manner inside respective shaft 29 and engaged internally in axially sliding manner by respective rod 51; and two gears 65 and 66 fitted to respective ends of shaft 64 projecting outwards of shaft 29. Gear 65 is housed inside chamber 27 and is supported axially and in rotary manner by shaft 29; and gear 66 is housed inside body 39 of respective fork 38, and is substantially aligned with respective arm 40.

Each device 22 also comprises a further gear 67 fitted to shaft 47 supporting disk 46; a toothed belt 68 looped about gears 66 and 67; and a further rocker arm 69, the central portion 70 of which pivots about a pin 71 coaxial with a respective axis 71a parallel to axis A2, and supported at one end 72 of respective bracket 31. Each rocker arm 69 comprises a first arm 73 extending from portion 70 towards respective gear 65, and defined by a sector gear meshing with gear 65; and a second arm 74 extending from portion 70 on the opposite side to arm 73, and supporting a tappet roller 75 made of ferromagnetic material and engaged, as explained more clearly later on, inside selecting device 21 to swing rocker arm 69 about respective axis 71a and so rotate disk 46 in one direction or the other about respective axis A1.

Device 21 comprises two cams 76 and 77 fitted, in angularly fixed positions with respect to platform 18 and inside chamber 27, to a plate 78 in turn fitted to a top end portion of shaft 23 and extending crosswise to axis A2. Cams 76 and 77 extend side by side about axis A2 and between stations 14 and 16, gradually get further apart as of station 14, have a substantially rectangular section, and define respective rolling tracks 79 and 80 facing each other and which are engaged selectively in rolling manner by rollers 75.

Cams 76 and 77 comprise respective input portions 81 and 82 (FIG. 1) made of ferromagnetic material, and which are connected to and selectively magnetized by a central selecting unit 83 forming part of device 21; and respective output portions 84 and 85 (FIG. 1) made of permanently magnetized ferromagnetic material and located downstream from respective portions 81 and 82 along respective tracks 79 and 80. More specifically, portions 81 and 82 are magnetized selectively by unit 83 to attract rollers 75 and cause rollers 75 to adhere to respective tracks 79 and 80; and portions 84 and 85 are magnetized permanently to keep rollers 75 in contact with respective tracks 79 and 80 once unit 83 has selected, in use, which of tracks 79 and 80 is to be engaged by rollers 75.

Output portions 84 and 85 of respective cams 76 and 77 are substantially circular, and are shaped to so move rollers 75 in relation to respective axes 71a as to swing respective rocker arms 69 about axes 71a and rotate respective disks 46 in one direction or the other about respective axes A1. More specifically, cam 76, located between axis A2 and cam 77, rotates disks 46, and hence respective diapers 2, anticlockwise in FIG. 1; and cam 77 rotates disks 46 clockwise in FIG. 1.

Since, as stated, heads 19 are maintained parallel to themselves at all times by respective shafts 29, the movement of each head 19 between stations 14 and 16 would cause the respective diaper 2 gripped, in use, by respective gripping device 20 to be rotated 90° about axis A2 with no change in the orientation of diaper 2 with respect to direction D, and more specifically with respect to direction D2, once it is fed onto conveyor 9. Cams 76 and 77, on the other hand, provide for rotating disk 46 of each device 20 in relation to respective head 19, so that diapers 2 are fed to station 15 and into respective pockets 16 with respective axes 2a crosswise to direction D2.

Though clearly understandable from the foregoing description, operation of unit 1 will be described, for the sake of clarity, with reference to two diapers 2 located in series along input portion P1 of path P and fed successively to station 14 by conveyor 8.

As the first of the two diapers 2 is fed to station 14 and positioned partially on a plate 86 extending from the end of upper conveying branch 13 of belt 12, a head 19 is moved forward by platform 18 across station 14 and in time with diaper 2, and actuator 55 of opening device 50 is disabled to move jaws 44 and 45 into the gripping position. More specifically, disks 46 and 48 so grip diaper 2 that respective axis A1 is located along axis 2a of diaper 2, at the same distance from folded edge 3 and ends 4.

Once diaper 2 is gripped by device 20, selecting unit 83 magnetizes one of input portions 81, 82 of cams 76, 77 to draw roller 75 of respective head 19 onto respective track 79, 80. And once roller 75 is positioned contacting one of tracks 79, 80, the rotation of platform 18 about axis A2 feeds head 19, or rather respective axis A1, along trajectory T, so that roller 75 rolls along the selected track 79, 80, and, as already described, diaper 2 is rotated about respective axis A1 in one direction or the other, depending on which of tracks 79 and 80 has been selected.

Whichever the case, the roller 75 of head 19 by which the next diaper 2 is picked up is drawn onto the other track 80, 79, so that the diapers 2 in succession 11 are alternately oppositely oriented inside respective pockets 15.

FIG. 3 shows an alternative arrangement of conveyors 8 and 9, in which directions D1 and D2 are parallel to each other. In this case, by simply varying the ratio of epicyclic transmission 34, axes A1 may be fed along a substantially straight trajectory T parallel to directions D1 and D2.

According to a variation not shown, as opposed to comprising two jaws 44 and 45, gripping device 20 may comprise a single suction jaw located in place of jaw 44 and comprising a suction plate, which is brought into contact with diapers 2 at station 14, and grips the diapers by suction generated through the plate by a suction device.

According to a further variation not shown, jaws 45 may be replaced by a number of jaws located beneath plane S and fed in time with jaws 44 through station 7 by a respective "spider" device. More specifically, each of the bottom jaws is fed through station 7 in time with a respective jaw 44 and in such a manner as to move towards jaw 44 to grip a respective diaper 2, and is fed together with jaw 44 along plane S and trajectory T to feed diaper 2 to station 16, after first rotating it 90° in one direction or the other about respective axis A1.

We claim:

1. A conveying unit for conveying elongated products, each product having a respective longitudinal axis, the unit comprising:

conveying means for successively feeding the products with the respective longitudinal axes parallel to a given traveling direction and along a path extending along a conveying plane; and orienting means located along said path for orienting the products by rotating the products 90° about a first axis of rotation crosswise to said conveying plane, so that the longitudinal axes of the products are positioned crosswise to said traveling direction, said orienting means including selecting means for selecting the products to be rotated in one direction or the other about said first axis of rotation, so that said products are oppositely oriented with respect to one another, gripping means including transfer heads for gripping each product at a pick-up station located along said path, transfer means for transferring the transfer heads from the pick-up station to an unloading station located along said path and downstream from the pick-up station in said traveling direction, and tappet means associated with each said transfer head to rotate each said gripping means about a respective first axis of rotation, and wherein said selecting means comprises cam means common to all the gripping means and engaged by said tappet means, the cam means extending at least between said pick-up station and said unloading station.

2. A unit as claimed in claim 1, wherein said cam means define, at least between said pick-up station and said unloading station, at least two tracks selectively engaged by said tappet means; said tracks each comprising a respective input portion and a respective output portion, each input portion of forming a selecting portion.

3. A unit as claimed in claim 1, wherein said orienting means rotate the products alternately in one direction or the other about said first axis of rotation, so that the products are alternately oppositely oriented.

4. A unit as claimed in claim 2, wherein said input portions are made of ferromagnetic material, and are magnetized selectively.

5. A unit as claimed in claim 1, wherein said transfer means comprise a rotary platform rotating about a second axis of rotation crosswise to said conveying plane; and said orienting means further comprising a number of said transfer heads associated with said gripping means and movable, together with said rotary platform, between said pick-up station and said unloading station.

6. A unit as claimed in claim 5, wherein said gripping means comprise a first gripping element fitted to the respective transfer head; and a second gripping element located on the opposite side of said conveying plane to the first gripping element, and movable, with respect to the first gripping element, between a forward position gripping a respective product, and a withdrawn position releasing the product.

7. A unit as claimed in claim 6, wherein said first and second gripping elements are fitted to the respective transfer head in a rotary manner about the respective first axis of rotation; and further including transmission means interposed between said selecting means and said gripping means to rotate at least one of said first and second gripping elements about the respective first axis of rotation.

8. A unit as claimed in claim 1, wherein a first and a second conveyor are located in series along said path and respectively upstream and downstream from said orienting means in said traveling direction; the first conveyor feeding the products to said pick-up station by feeding the products in said traveling direction with the respective longitudinal axes of the products parallel to the traveling direction; and the second conveyor receiving the products from said orienting means at said unloading station, and feeding the products in said traveling direction with the respective longitudinal axes of the products crosswise to the traveling direction.

9. A unit as claimed in claim 8, wherein said first conveyor defines, in said traveling direction, an input direction of the products, and an input portion of said path; said second conveyor defining, in said traveling direction, an output direction of the products, and an output portion of said path.

10. A unit as claimed in claim 9, wherein said orienting means comprise transmission means for moving said transfer heads between said pick-up station and said unloading station, while maintaining the respective first axis of rotation along a given trajectory.

11. A unit as claimed in claim 10, wherein said input direction and said output direction are parallel to each other.

12. A unit as claimed in claim 11, wherein said trajectory is a substantially straight trajectory.

13. A unit as claimed in claim 10, wherein said input direction and said output direction are crosswise to each other.

14. A unit as claimed in claim 13, wherein said trajectory is a substantially circular trajectory.

15. A unit as claimed in claim 4, wherein said output portions comprise respective permanent magnets.

16. A unit as claimed in claim 15, characterized in that said tappet means comprise, for each said transfer head, a respective roller made of ferromagnetic material.

17. A unit as claimed in claim 16, and further including a transmission means interposed between said selecting means and said gripping means to rotate at least one of said first and second gripping elements about the respective first axis of rotation, and wherein said transmission means comprise, for each said transfer head, a respective rocker arm, which is oscillated about a respective axis of oscillation by said tappet means; the rocker arm being connected to one of said first and second gripping elements to rotate the gripping element 90° in one direction or the other about the respective first axis of rotation.

18. A unit as claimed in claim 5, wherein said rotary platform rotates in a continuous circular movement about said second axis of rotation; said transfer heads being fitted in a rotary manner to said rotary platforms, and rotating about a third axis of rotation.

19. A unit as claimed in claim 18, wherein said first and said third axes of rotation are located a given distance from each other.

* * * * *